US006706405B2

(12) United States Patent
Sanders et al.

(10) Patent No.: US 6,706,405 B2
(45) Date of Patent: Mar. 16, 2004

(54) COMPOSITE COATING FOR IMPARTING PARTICEL EROSION RESISTANCE

(75) Inventors: Bridget Marion Sanders, Yorktown, VA (US); Karl Erik Wiedemann, Seaford, VA (US)

(73) Assignee: Analytical Services & Materials, Inc., Hampton, VA (US)

( * ) Notice: Subject to any disclaimer, the term of this patent is extended or adjusted under 35 U.S.C. 154(b) by 122 days.

(21) Appl. No.: 10/073,833

(22) Filed: Feb. 11, 2002

(65) Prior Publication Data

US 2003/0152785 A1 Aug. 14, 2003

(51) Int. Cl.[7] .................. B32B 27/38; B32B 25/20; C08L 63/02; C08L 83/04; C08R 3/00
(52) U.S. Cl. .................. 428/413; 428/447; 427/386; 427/387; 523/425; 523/440; 523/442; 523/443; 524/413; 524/428; 524/493; 524/518; 524/588
(58) Field of Search .................. 524/413, 428, 524/493, 518, 588; 525/476; 427/386, 387; 428/413, 447; 523/425, 440, 442, 443

(56) References Cited

U.S. PATENT DOCUMENTS

| 3,183,198 | A | | 5/1965 | Wagner ........................ 260/18 |
| 3,297,724 | A | | 1/1967 | McConnell et al. ......... 260/348 |
| 4,110,317 | A | | 8/1978 | Moraveck ..................... 528/77 |
| 4,202,811 | A | | 5/1980 | Michael et al. .............. 523/435 |
| 4,250,074 | A | | 2/1981 | Foscante et al. ............. 523/428 |
| 4,294,746 | A | | 10/1981 | Blair et al. ................... 523/461 |
| 4,385,158 | A | | 5/1983 | Mikami et al. .............. 525/476 |
| 4,546,018 | A | | 10/1985 | Ryuzo et al. ............. 427/407.2 |
| 4,600,436 | A | | 7/1986 | Traver et al. ................... 106/3 |
| 4,609,692 | A | | 9/1986 | Huybrechts et al. ........ 523/439 |
| 4,661,577 | A | | 4/1987 | Jo Lane et al. ................ 528/10 |
| 4,678,835 | A | | 7/1987 | Chang et al. ................ 525/100 |
| 4,783,222 | A | * | 11/1988 | Druschke ............... 106/287.13 |
| 4,851,481 | A | | 7/1989 | Kuriyama et al. ............ 525/454 |
| 4,859,722 | A | | 8/1989 | Shiobara et al. ............. 523/433 |
| 5,019,607 | A | | 5/1991 | Coltrain et al. .............. 523/435 |
| 5,182,174 | A | * | 1/1993 | Stephenson .................. 428/450 |
| 5,391,678 | A | * | 2/1995 | Bard et al. ..................... 528/25 |
| 5,618,631 | A | * | 4/1997 | Meguriya et al. ........... 428/513 |
| 5,650,453 | A | | 7/1997 | Eckberg et al. ................ 522/31 |
| 5,691,401 | A | | 11/1997 | Morita et al. ................ 523/435 |
| 5,714,265 | A | * | 2/1998 | Meguriya et al. ........... 428/413 |
| 5,760,103 | A | | 6/1998 | Wentzell ...................... 523/122 |
| 5,804,616 | A | | 9/1998 | Mowrer et al. ............. 523/421 |
| 5,904,959 | A | | 5/1999 | Martin ........................ 427/256 |
| 6,001,923 | A | | 12/1999 | Moncur et al. ............. 524/590 |
| 6,107,370 | A | | 8/2000 | Bowlin ........................ 523/461 |
| 6,274,650 | B1 | | 8/2001 | Cui .............................. 523/457 |

* cited by examiner

Primary Examiner—Jeffrey B. Robertson

(57) ABSTRACT

Erosion resistant coating compositions comprising a poly (Bisphenol A-co-epichlorohydrin) glycidyl end-capped component, an active hydrogen compound, a linear siloxane and a silsesquioxane. Protective coatings formed from such a composition impart particle-erosion resistance to parts having such a coating disposed on some portion of their surface.

12 Claims, No Drawings

COMPOSITE COATING FOR IMPARTING PARTICEL EROSION RESISTANCE

BACKGROUND

1. Field of the Invention

The present invention relates to coating compositions that impart particle-erosion resistance and articles having such coatings disposed on some portion of their surface. More particularly, it relates to coating compositions comprising an interpenetrating network of polymers and hard particles whereby a resilient matrix with a dispersion of fine particles is formed, where said interpenetrating network of polymers comprise a mixture of a poly(Bisphenol A-co-epichlorohydrin) glycidyl end-capped component, an active hydrogen compound, a linear siloxane, and a silsesquioxane.

2. Description of Prior Art

Many mechanical parts are subjected to the action of moving particles suspended in air or water resulting in erosion. Erosion is the loss of material from a surface due to the mechanical interaction between the surface and particles. For example impellers, airfoil leading edges, propeller blades and similar parts are subjected to operating conditions that may contain large amounts of sand or other particles. The action of the moving particles causes loss of material that may impair the operation of the part, leading to a shortened service life. The shortened service life leads to higher maintenance costs and increased down time.

In an attempt to provide longer service life, coatings have been applied to parts. The prior coatings failed to provide significantly longer service life, used dense materials that increased stresses in rotating machinery, were not adequately resilient to impact and were not sufficiently resistant to abrasion, that is they did not adequately resist wear when they come into moving contact with an abrasive surface.

A common attempt to extending service life was to apply a layer of a high elastic modulus material such as a metal oxide, carbide or nitride using chemical vapor deposition or plasma spray. This method applies a very thin, hard coating to protect the part. This method may be undesirable because it often requires the part to be heated, which can damage the part through thermal degradation and the negation of prior heat treatments. Also high elastic modulus materials disposed on a surface tend to significantly reduce the service life of a part by promoting fatigue cracks that reduce the mechanical strength of the part.

Another approach to extending service life was to apply a urethane coating containing an isocyante-terminated prepolymer comprising a polytetramethylene ether glycol having a molecular weight between 500 and 700. For example, see U.S. Pat. No. 4,110,317. This method applies a thicker, more resilient coating than chemical vapor deposition or plasma spray. The polytetramethylene ether glycol is a linear molecule, but the molecular weight is too small to provide a resilient coating. While this coating provides some erosion resistance, it does not resist erosion well.

Fluorinated polyurethanes, similar to those presented in U.S. Pat. No. 6,001,923, are highly crosslinked, as are straight epoxy-type coatings similar to those presented in U.S. Pat. No. 6,274,650. A high level of crosslinking implies short linear segments, which are linear segments of low molecular weight, which in turn suggests a lack of resilience necessary for resisting erosion. Further, these prior compositions lacked a dispersion of hard particles for improving strength and abrasion resistance.

Prior coatings did not form interpenetrating networks like the present invention. Nor did they attain the essential physical qualities necessary for providing erosion resistance. U.S. Pat. No. 5,904,959 employs an epoxy resin and epoxy-modified polysiloxanes that results in a stratified coating which is silicone rich at the surface, and decreases in silicone content as one moves away from the surface. Because of the quantities of polysiloxane used and the epoxy modification to the siloxane, one would expect a high degree of crosslinking that would limit the quantity and length of the linear siloxane segments. Also, because it is not a uniform coating, as the surface is worn the coating properties can be expected to change.

An epoxy-polysiloxane polymer composition is described in U.S. Pat. No. 5,804,616. This composition combines non-aromatic epoxy resin and polysiloxane ingredients using water to promote hydrolysis. In the cured form, the epoxy polysiloxane composition is a uniformly dispersed arrangement of linear epoxy chain fragments that are crosslinked with a continuous polysiloxane chain, thereby forming a non-interpenetrating network. The polysiloxane specified has a molecular weight of between 400 and 10,000, which is too small to provide adequate resilience. Further, the crosslinking of the polysiloxane with the epoxy chain fragments produces a rigid structure, further reducing resilience. The use of water in this composition prevents the use of some silanes and curing agents that rely upon exposure to atmospheric moisture to enable curing. When water is added directly to the composition before the removal of solvents, an undesirable gel may be formed.

A siliconized epoxy coating is described in U.S. Pat. No. 6,107,370. The coating comprises an epoxy resin, a silanol based poly dimethylsiloxane, an amine functional silicone polymer, and a distilled fatty nitrile. The coating is prepared from silicone emulsions, which introduce water having the undesirable effects mentioned previously. The coating contains less than 5% polydimethylsiloxane, which is insufficient for producing resilience. Further, the polysiloxane is in large measure crosslinked with the epoxy polymer, which creates a rigid structure further reducing resilience.

An interpenetrating polymer network comprising epoxy polymer and polysiloxane is taught in U.S. Pat. No. 4,250,074. This teaches a cross-linked, interpenetrating polymer network comprising epoxy resin and silane groups. The mixture requires a substantially balanced rate of cure for the two components and yields a heavily cross-linked network essentially free from linear siloxane segments. The siloxane component is formed from silanes having three or more hydrolyzable groups per silicon. The hydrolyzable groups react with water in the mixture to form silanols, which subsequently undergo polycondensation. Because the silanes have three or more hydrolyzable groups per silicon, the polycondensation products will be essentially 100 percent cross-linked. Such a network is too stiff to provide the necessary resilience for resisting particle erosion. For good resilience it is essential that long linear siloxane segments be present in sufficient quantity, which can only be achieved with silanes having two hydrolyzable groups per silicon and only under conditions that cannot be achieved by ordinary polycondensation or when substantial quantities of silanes having three more hydrolyzable groups per silicon are present. The mixture also lacks a dispersion of hard particles to provide the necessary strength and resistance to abrasion. Due to the composition of the mixture, the required balanced co-curing of components limits the flexibility of formulation and also limits the conditions for using the mixture.

In U.S. Pat. No. 5,650,453, a coating is taught that combines epoxy functional polysiloxane polymers with vinyl ether monomers and oligomers. This combination results in an ultraviolet (UV) light cured, highly-crosslinked hard coating. Because this coating is hard, it lacks the resiliency that the present invention has. Also, because it is UV cured, hard particles that resist abrasion cannot be added because they block UV light and thus interfere with the curing process.

Prior coatings lacked the required dispersion of hard particles to provide strength and abrasion resistance. They did not contain linear siloxane segments in sufficient quantity or sufficient length to provide resilient matrices. They required co-curing of components that was difficult to balance, thus they restricted the ability to formulate and use the coatings. The prior coatings failed to provide significantly longer service life for parts exposed to particle erosion, they failed to absorb impact or were not abrasion resistant. They also tended to increase stress in rotating machinery and adversely affected fatigue life.

OBJECTS AND ADVANTAGES

Accordingly, besides the objects and advantages described above, several objects and advantages of the present invention are:

a. to provide a uniform coating comprising an interpenetrating network of polymeric phases b. to provide a dispersion of hard particles for improving strength and resistance to abrasion c. to provide essentially linear siloxane segments of sufficient quantity and sufficient length for imparting resilience d. provide a mixture of components that has no difficult requirement for co-curing of the components e. to provide a coating composition essentially free from water f. to provide a coating that can allow significantly longer service life of parts g. to provide a coating that does not increase stresses in rotating parts h. to provide a coating that does not adversely effect the fatigue life of parts i. to provide a coating that may easily be applied using conventional techniques (i.e. dipping, brushing or spraying)

j. to provide a coating that the thickness may be varied based on application technique used Further objects and advantages will become apparent from consideration of the following description.

SUMMARY

The present invention relates to coating compositions that impart improved particle-erosion resistance when disposed on some portion of an article's surface by providing a dispersion of hard particles in a resilient matrix. The resilient matrix is provided by an interpenetrating polymeric network comprising a strong, stiff, crosslinked epoxy polymer penetrated by a siloxane polymer. The epoxy polymer is provided by the reaction of glycidyl end-capped poly(bisphenol A-co-epichlorohydrin) with active hydrogen compounds. The siloxane polymer is provided by the reaction of linear siloxanes with silsesquioxane compounds. There is minimal cross-linking between the polymers and no requirement for a balanced co-curing. The use of high molecular weight and substantially linear siloxane ensures that there will be sufficient resiliency to adequately absorb impact of impinging particles. The dispersion of hard particles provides increased strength and abrasion resistance.

The present invention may be applied to the surface of articles using many of the standard techniques known to those skilled in the art, including, but not limited to, dipping, flow coating, brushing and spraying. It will be appreciated by those skilled in the art that the selection of technique will depend on available equipment and the geometry of the article to be coated.

DESCRIPTION OF INVENTION

The coatings comprise interpenetrating networks of polymers and hard particles whereby a resilient matrix with a dispersion of fine hard particles is formed, where said interpenetrating networks of polymers comprise a mixture of a poly(Bisphenol A-co-epichlorohydrin) glycidyl end-capped component, an active hydrogen compound, a linear siloxane, and a silsesquioxane. A mixture containing the uncured coating components and solvents is prepared and applied to a surface. The solvents are allowed to evaporate, and the coating is cured by means that are well understood to those skilled in the art. It will be appreciated that the choice of curing means is governed by the particular embodiment of the invention and that those curing means include, but are not limited to, thermal cures, addition cures, and condensation cures. In some preferred embodiments of the invention, moisture absorbed from the atmosphere produces the cure of one or more of the polymers. In one preferred embodiment, moisture causes the hydrolysis of alkoxy and acetoxy silanes to form polycondensation products. In another preferred embodiment moisture causes the hydrolysis of a ketimine to form a primary amine that reacts with the poly(Bisphenol A-co-epichlorohydrin) glycidyl end-capped component to form the epoxy polymer. In this description of the invention, VEN is understood to represent Vicker's Hardness Number.

poly(Bisphenol A-co-epichlorohydrin) glycidyl end-capped components: Preferably, the poly(Bisphenol A-co-epichlorohydrin) glycidyl end-capped components comprise components with multiple oxirane functionality. More preferably, the components will be difunctional or trifunctional. Preferably, the components will have an epoxide equivalent weight between 150 and 600. More preferably, the components will have an epoxide equivalent weight between 185 and 550. The poly(Bisphenol A-co-epichlorohydrin) glycidyl end-capped component should be between 5 and 40 weight percent of the total composition, less the weight of any solvents.

Active hydrogen compounds: Preferably, the active hydrogen compounds result in coupling as well as cross-linking with the poly(Bisphenol A-co-epichlorohydrin) glycidyl end-capped components. More preferably, the active hydrogen compounds include aliphatic polyamines, aliphatic polyamides, derivatives of aliphatic polyamines or aliphatic polyamides, aromatic polyamines, aromatic polyamides, derivatives of aromatic polyamines or aromatic polyamides, polymercaptans, polyphenols, polybasic acids, ketimines or acid anhydrides. Most preferably, the active hydrogen compound is a polyamine, such as Epicure Curing Agent 3164, or a ketimine, such as Epicure Curing Agent 3502. Both Epicure 3164 and Epicure 3502 are products of the Shell Chemical Company. The active hydrogen compound should be present in sufficient quantity to react completely with the poly(Bisphenol A-co-epichlorohydrin) glycidyl end-capped components, usually between 2 and 10 percent of the weight of the mixture less the weight of any solvents.

Linear siloxane compounds: The mixture may contain any number of different linear siloxane compounds, which have the general formula:

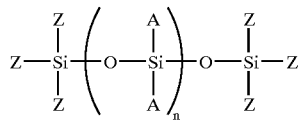

where A, called back-bone groups, are unreactive unhydrolyzable groups, and Z, called terminal groups, are hydrolyzable groups, reactive unhydrolyzable groups, unreactive unhydrolyzable groups, or a mixture of two or all three. Unreactive unhydrolyzable groups include, but are not limited to, methyl, ethyl, propyl, trifluoropropyl, butyl, phenyl and, in some cases, vinyl, acryloxypropyl and methacryloxypropyl groups. Hydrolyzable groups include, but are not limited to, chloro, hydro, methoxy, ethoxy, propoxy, butoxy, acetoxy, methylethylketoximino, benzamido, and dimethylamino groups. Reactive unhydrolyzable groups include, but are not limited to, hydroxy, aminopropyl, epoxypropoxypropal, epoxycyclohexylethyl, and in some cases, vinyl, hydroxyethoxypropyl, acryloxypropal and methacryloxypropal groups. Although it is desirable that the siloxane be substantially linear, it may also be branched, provided that the frequency of branching is very low, provides for long linear segments between branches and does not prevent the formation of a resilient matrix. For instance, branching such that the lengths of linear segments between branches are generally greater than 4000 in terms of molecular weight would still tend to produce a resilient matrix. While numerous backbone groups may be substituted for the methyl group to produce block polymers, copolymers and homopolymers, it is important that these backbone groups do not tend to crosslink with the epoxy components because this would undesirably stiffen the silicone polymer and reduce the matrix resilience. Thus, epoxyfunctional or glycidyl-functional backbone groups that would tend to react with the active hydrogen compounds of the epoxy polymer should be avoided including, but not limited to, epoxypropoxypropal and epoxycyclohexylethyl groups. For the same reason, amine-functional backbone groups that would tend to react with the glycidyl end-capped poly(bisphenyl A-co-epichlorohydrin) should also be avoided. It is essential that some portion of the terminal groups on some portion of the linear siloxanes be either hydrolyzable groups or reactive unhydrolyzable groups to permit reaction with the silsesquioxanes and form the siloxane polymer. Preferably, the linear siloxane compound will have a molecular weight greater than 4000. More preferably, the molecular weight will be greater than 10,000. The linear siloxane compound should be between 10 and 95 percent of the weight of the mixture, less the weight of any solvent.

Silsesquioxane formers and compounds: The term silsesquioxane is used to include both silsesquioxane compounds and silsesquioxane formers. Silsesquioxanes compounds have the general formula $XSiO_{3/2}$ where X is an unhydrolyzable group including, but not limited to, methyl, ethyl, vinyl, butyl, allyl, aminopropyl, trifluoropropyl, acryloxypropyl, methacryloxypropyl, and phenyl groups. The silsesquioxanes can be fully condensed, as represented by the formula $XSiO_{3/2}$ or incompletely condensed, as represented by the general formula $XSiO_{(3/2)-x}R_{2x}$ where R is a hydroxide, a hydrolyzable group, or a mixture of hydroxide and hydrolyzable groups. Hydrolyzable groups include, but are not limited to, chloro, hydro, methoxy, ethoxy, propoxy, acetoxy, and ketoximino groups. The silsesquioxane compounds may be added directly or as silsesquioxane formers having the general formula $XSiOR_3$. Silsequioxane compounds form from the formers via hydrolytic condensation reactions. The preferred silsesquioxane formers are methyltriacetoxysilane, ethyltriacetoxysilane, vinyltriacetoxysilane, methyltrimethoxysilane, ethyltrimethoxysilane, vinyltrimethoxysilane, methyltriethoxysilane, ethyltriethoxysilane, vinyltriethoxysilane, 3-aminopropyltrimethoxysilane, 3-aminopropyltriethoxysilane, methyltris(methylethylketoximino)silane, ethyltris(methylethylketoximino)silane, vinyltris(methylethylketoximino)silane or two or more of the above silanes. The silsesquioxane formers react with silanol groups and water. Therefore, it is important that water be excluded as much as possible from the composition to prevent premature hydrolysis and condensation. Because water may be inadvertently introduced by the agency of other components that contain water that was incorporated during their manufacture or introduced during their storage and handling, special precautions may be necessary to adequately exclude water. The silsesquioxane compounds and silsesquioxane formers work together with the linear siloxane compounds to form the siloxane polymer through addition and condensation reactions. Either the silsesquioxane compounds or the formers or both should be present in sufficient quantity to essentially react completely with the reactive terminating groups on the linear siloxane compounds. The preferred total amount of silsesquioxane compounds and formers is from 0.5 to 10 percent of the weight of the mixture, less the weight of any solvent. The inclusion of some amine-functional groups in the silsesquioxanes is often desirable because these tend to help catalyze condensation reactions and tend to promote adhesion. However, the total quantity of amine-functional silanes should be less than about 1 percent of the weight of the mixture, less the weight of any solvent. Greater quantities will significantly reduce the resiliency of the matrix.

Catalyst: Numerous catalysts are known to those skilled in the art, and it will be appreciated that the selection of catalyst depends largely on the contemplated reactions between the linear siloxane compound and the silsesquioxane compounds and formers. Organic peroxides would be preferred for thermal cures, platinum for addition cures, and organometallics for condensation cures. Where an organometallic is selected, the preferred catalyst is an organotin or a stannous compound. Most preferably it is dibutyltin dilaurate. The catalyst should be present in sufficient quantities to allow chemical reactions to occur, usually less than 2 percent of the weight of the mixture, less the weight of any solvent.

Hard particles: The hard particles comprise finely divided materials with a hardness of greater than 800 VHN. More preferably, the hard particles have a hardness greater than 1000 VHN. By hardness, it is meant the inherent hardness of the material, that is the hardness the material would have if it were in bulk form instead of finely divided particles or a powder. The hard particles may comprise a single finely divided material or a mixture of finely divided materials comprising oxides, borides, carbides, nitrides, amorphous or crystalline carbon, and amorphous or crystalline silica. Preferably, the materials are selected from the group containing titanium, tungsten, zirconium and silicon compounds. More preferably, the hard particles comprise titanium diboride, titanium carbide, silicon nitride, tungsten carbide, titanium nitride, titanium carbonitride, silicon oxide, aluminum oxide and zirconium diboride. The particles should have a particle size of less than 100 microns, preferably less than 10 microns, most preferably less than 2 microns. The hard particles should be between 0 and 60 weight percent of the mixture, less the weight of any solvents. The hard particles must be thoroughly dried before adding. For some finely divided materials, adequate dryness can be assured by holding them at a temperature above 100 degrees Celsius for a period of time sufficient to allow all adsorbed water to be removed. They also may be treated with hexamethyldisilazane, polydimethylsiloxane, dimethyldichlorosilane, aminopropyltriethoxysilane or other agents to help improve compatibility with the matrix.

Solvents: Because the linear siloxane compound, the glycidyl end-capped poly(bisphenyl A-co-epichlorohydrin) and the dispersion of hard particles tend to make the mixture very viscous, the addition of solvents is usually necessary to render the mixture more easily employed. As can be appreciated by those skilled in the art, selection of the proper solvents is important for preventing unmixing and depends in good measure on the silsesquioxane compounds and formers selected. The preferred solvents are organic in nature and include, but are not limited to, alcohols, ethers, aliphatic hydrocarbons, aromatic hydrocarbons, ketones, naphthenic hydrocarbons and terpenes. Specific preferred solvents are xylene, VM&P naptha, mesitylene, toluene, ligroin, 2-butanone, and 4-methyl-2-pentanone. The solvents may be used in varying amounts and in various combinations based on the specific application. It is preferable to use the minimum amount necessary for a specific application.

Additional Modifiers: The coating may also contain other components such as plasticizers, pigments, Theological modifiers, thixotropic agents, antifoam agents, emulsifiers and the like to achieve desired properties.

Mixing Considerations: The present invention may be prepared by combining the components in various sequences and by various means. A thorough mixing of the poly (Bisphenol A-co-epichlorohydrin) components and the siloxane components is essential. Mixing should be conducted in a way that ensures the complete and uniform dispersion of these components. A planetary mixer or mixing technique that ensures that material along the wall and bottom of the mixing container is periodically removed and circulated into the interior of the container is desirable. A person skilled in the art of preparing viscous mixtures can perform this mixing by hand provided that the quantity being prepared is small. For larger quantities, mechanical mixing is essential. In general, magnetic stir plates and other light duty laboratory stirrers are not adequate for this purpose. Laboratory blenders can be used provided that the mixing operation is interrupted periodically to allow the walls of the blender to be scraped and material from the bottom to be stirred in. Not only are the liquid components viscous, but the addition of the finely divided hard particles tends to further increase viscosity. Use of solvents helps reduce viscosity and improve mixing, but such solvents need to be chosen with care to prevent segregation of the components. Often a balance of solvents is needed to insure that the mixture remains homogenous. Preferably, mixing is carried out using a planetary mixer. More preferably mixing is carried out using a planetary mixer with a high-speed disperser.

Process for Preparing Coating Mixture: A preferred method of preparing the coating is to combine the linear siloxane component with any solvents, to which the selected poly(Bisphenol A-co-epichlorohydrin) glycidyl end-capped component is then added. The hard particles are then combined, preferably to a minimum Hegman fineness of 4. Before combining, the hard particles must be thoroughly dried, that is they must be held at a temperature above 100 degrees Celsius for a period of time sufficient to allow all adsorbed water to be removed. The selected catalyst is then combined and the silsesquioxane is added. The mixture should be thoroughly mixed, and allowed to stand approximately 15 minutes. At this point, preparation can be interrupted. The mixture prepared so far can be packaged as part A and the remaining ingredient, the active hydrogen compound, can be packaged as part B with the two parts to be later combined immediately before using. Separate packaging of the active hydrogen compound is not necessary if the mixture is to be used immediately or if the active hydrogen compound is a ketimine, which does not become activated until reacting with moisture absorbed from the air. Any additional components such as pigments, plasticizers or Theological modifiers should be added at the appropriate stage of mixing.

Application of Coating: The coating may be applied by a variety of methods including, but not limited to, dipping, flow coating, brushing or spraying, depending on available equipment and the geometry of the article to be coated. Based on the equipment and technique used to apply the coating resin, the thickness of the coating may be varied.

PREFERRED EMBODIMENTS

The linear siloxane component is combined with an amount of organic solvent. The selected poly(Bisphenol A-co-epichlorohydrin) glycidyl end-capped component is then mixed in. The dried hard particles are then combined into the mixture. The catalyst is then combined and the silsesquioxane is added. After the mixture is thoroughly mixed, it is allowed to stand approximately 15 minutes. At this point preparation may be paused indefinitely and the mixture packaged as a two-part coating. The final step is to add an active hydrogen compound and mix thoroughly.

EXAMPLES

The following examples are intended to further illustrate the invention and enable those skilled in the art to more readily understand it. All parts and percentages are given by weight unless noted. They are not intended to limit the scope of the invention.

Example 1

A coating composition was prepared by combining 30 parts of a linear siloxane, silanol terminated poly dimethylsiloxane having a molecular weight of 110,000, with 57 parts of a solvent, xylene. To this 5.4 parts of a poly (Bisphenol A-co-epichlorohydrin) glycidyl end-capped component, Epon 1001-X-75 was added and thoroughly mixed. Hard particles in the form of hexamethyldisilazane treated fume silica were added at the level of 3.2 parts. To the resulting mixture, 0.068 parts of a catalyst, dibutyltin dilaurate was added. This was combined with 2 parts of a silsesquioxane former, ethyl triacetoxysilane. The mixture was allowed to stand approximately 15 minutes, and 2.6 parts of an active hydrogen compound, Epicure 3164, believed to be a polyamine, was added. The resulting composition was applied to test specimens and allowed to cure at ambient temperature and humidity for 7 days before testing.

Example 2

A coating composition was prepared by combining 25 parts of a linear siloxane, silanol terminated poly dimethylsiloxane having a molecular weight of 110,000, with 49 parts of a solvent, xylene. To this 4.6 parts of a poly(Bisphenol A-co-epichlorohydrin) glycidyl end-capped component, Epon 1001 X-75 was added and thoroughly mixed. Hard particles in the form of hexamethyldisilazane treated fume silica were added at the level of 2.8 parts. To the resulting mixture, 0.0585 parts of a catalyst, dibutyltin dilaurate was added. This was combined with 1.74 parts of a silsesquioxane former, ethyl triacetoxysilane. The mixture was allowed to stand approximately 15 minutes, and 13.9 parts of hard particles in the form of thoroughly dried titanium carbide powder was added. An active hydrogen compound, Epicure 3164, believed to be a polyamine, was added in 2.2 parts and the mixture was thoroughly mixed.

Example 3

A coating composition was prepared by combining 34 parts of a linear siloxane, silanol terminated poly dimethylsiloxane having a molecular weight of 110,000, with 33 parts of a solvent, xylene. Hard particles in the form of Cab-o-sil TS610 treated fume silica were added at the level of 3.7 parts. To this, 4.8 parts of a poly(Bisphenol A-co-epichlorohydrin) glycidyl end-capped component, Epon 1001X-75 was added. To this mixture, 11.6 parts of hard particles in the form of thoroughly dried tungsten carbide powder and 0.53 parts of an active hydrogen compound, Epicure 3502, a ketimine, were added and thoroughly mixed. A catalyst, dibutyltin dilaurate was added at 0.0784 parts. To the resulting mixture, 11.5 parts of a silsesquioxane former, vinyl triacetoxy silane and 0.69 parts of an amine functional silsesquioxane former, 3-aminopropyltriethoxysilane were added and thoroughly stirred. The resulting composition was applied to test specimens and allowed to cure at ambient temperature and humidity for 7 days before testing.

Comparative Example 1

A comparative example outside the scope of the present invention was prepared to illustrate the importance of including a sufficient quantity of siloxane polymer component to impart matrix resilience.

A coating composition was prepared by combining 40 parts of a poly(Bisphenol A-co-epichlorohydrin) glycidyl end-capped component, Epon 1001 X-75 with 18.8 parts of an active hydrogen compound, Epicure 3164, believed to be a polyamine, and 42 parts of thoroughly dried hard particles, silicon nitride. The resulting composition was applied to test specimens and allowed to cure at ambient temperature and humidity for 7 days before testing.

Comparative Example 2

A comparative example outside the scope of the present invention was prepared to illustrate the importance of employing linear polysiloxanes of sufficiently high molecular weight. The Triplus 178 Solventless Silicone used is a methoxy terminated methylsilsesquioxane-dimethylsiloxane copolymer with a viscosity of 20 to 100 cSt. leading us to conclude that the molecular weight of the linear dimethylsiloxane segments is less than 4000, which we believe is too small for imparting adequate matrix resilience. A coating composition was prepared by combining 25 parts of a linear siloxane, Triplus 178 Solventless Silicone, with 4.5 parts of a poly(Bisphenol A-co-epichlorohydrin) glycidyl end-capped component, Epon 1001 X-75. To this, solvents were added, 34 parts xylene and 32 parts 4-methyl-2-pentanone. To the mixture 2.7 parts of hard particles, hexamethyldisilazane treated fume silica was added. The resulting mixture was combined with 2.2 parts of an active hydrogen compound, Epicure 3164, believed to be a polyamine. The resulting composition was applied to test specimens and allowed to air dry for 30 minutes. It was then cured at 200 degrees Celsius for 10 hours before testing.

Material Availability

Silanol terminated poly dimethylsiloxane having a molecular weight of 110,000 is available from Gelest, Inc.

Epon 1001-X-75, Epicure 3164 and Epicure 3502 are all trademarks of and available from Shell Chemical Company.

Cab-o-sil TS610 treated fume silica is a trademark of and available from Cabot Corporation.

Triplus 178 Solventless Silicone is a trademark of and available from GE Silicones.

Results

| Example | Surface Recession Rate, nm/g |
|---|---|
| 1 | 51 |
| 2 | 66 |
| 3 | 42 |
| Comparative 1 | 650 |
| Comparative 2 | 4250 |

The surface recession rates are shown in nanometers of surface recession per gram of erodent. It can be seen from these examples that the examples of the invention were more resistant to erosion than the comparative examples. Comparative Example 1 does not have any siloxane polymer. Comparative Example 2 does contain a siloxane polymer, but one having a linear siloxane of low molecular weight. The large surface recession rate indicates that it was not erosion resistant. Thus, it can be concluded that it is necessary for good erosion resistance to have a linear siloxane of sufficiently high molecular weight present.

Conclusions, Ramifications and Scope

The coating presented in this invention can be used to significantly extend the service life of parts subjected to particle erosion, thus reducing maintenance costs and down time. It also does not increase stresses in rotating parts. It provides good impact and abrasion resistance and does not adversely effecting the fatigue life of the part. It may easily be applied using conventional techniques and the thickness of the coating may be varied based on the technique used.

Although the above description contains many specificities, these should not be construed as limiting the scope of this invention, but as merely providing illustrations of some preferred embodiments of this invention. For example, other epoxy-functional compounds may be substituted for the poly(Bisphenol A-co-epichlorohydrin) glycidyl end-capped component, such as glycidyl end-capped poly (Bisphenol F-co-epichlorohydrin) and other aromatic and aliphatic compounds with glycidyl functionality, including mono-functional compounds.

We claim:
1. A process comprising:
  a) forming a composition by combining:
    i) a linear siloxane,
    ii) a poly(Bisphenol A-co-epichlorohydrin) glycidyl end-capped component,
    iii) a silsesquioxane,
    iv) finely divided particles have an inherent hardness of greater than 800 VHN,
    v) and an active hydrogen compound, b) appling said composition to a surface said linear siloxane polymer having some portion of its terminal groups being selected from the group consisting of hydrolyzable groups and reactive unhydrolyzable groups.

2. The process of claim 1 wherein said active hydrogen compound is kept separate until immediately before applying said composition to said surface.

3. Articles have a coating disposed on some portion of their surface wherein said coating is comprised of:
   a) a linear siloxane,
   b) a poly(Bisphenol A-co-epichlorohydrin) glycidyl end-capped component,
   c) a silsesquioxane,
   d) finely divided particles have an inherent hardness of greater than 800 VHN,
   e) and an active hydrogen compound said linear siloxane polymer having some portion of its terminal groups being selected from the group consisting of hydrolyzable groups and reactive unhydrolyzable groups.

4. A composition comprising:
   a) an epoxy polymer consisting of a poly(Bisphenol A-co-epichlorohydrin) glycidyl end-capped component,
   b) an active hydrogen compound,
   c) a linear siloxane polymer,
   d) finely divided particles having an inherent hardness greater than 800 VHN,
   e) where said epoxy polymer and said linear siloxane polymer are interpenetrating, said linear siloxane polymer having some portion of its terminal groups being selected from the group consisting of chloro, methoxy, ethoxy, propoxy, butoxy, acetoxy, methylethylketoximino, benzamido, dimethylamino, and reactive unhydrolyzable groups, and crosslinking of said linear siloxane polymer and said epoxy polymer is substantially absent, whereby a resilient matrix is formed upon curing.

5. The composition of claim 4 where said composition further comprises silsesquioxanes.

6. The composition of claim 4 where said linear siloxane polymers are essentially free of amino-functional side groups.

7. The composition of claim 4 where said linear siloxane polymers are essentially free of glycidyl-functional side groups.

8. The composition of claim 4 where said linear siloxane polymer is present in 10 to 95 percent of the composition weight, less the weight of any solvent.

9. The composition of claim 4 where the active hydrogen compound is a ketimine.

10. The composition of claim 4 where the finely divided had particles are selected from the group consisting of metal oxides, metal nitrides, metal carbides, amorphous silica, crystalline silica, and carbon.

11. The composition of claim 4 where the ingredients are essentially water free.

12. The process of claim 1 wherein said active hydrogen is a ketimine whereby the necessity of separate packaging for the active hydrogen compound may be avoided.

* * * * *